United States Patent
Miyasaka (10) Patent No.: US 11,890,790 B2
(45) Date of Patent: Feb. 6, 2024

(54) PRESSING MACHINE

(71) Applicant: SEIKO EPSON CORPORATION, Tokyo (JP)

(72) Inventor: Yoichi Miyasaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/878,102

(22) Filed: Aug. 1, 2022

(65) Prior Publication Data
US 2023/0045008 A1    Feb. 9, 2023

(30) Foreign Application Priority Data
Aug. 3, 2021   (JP) .................... 2021-127233

(51) Int. Cl.
 *B29C 43/34* (2006.01)
 *B29C 43/36* (2006.01)
 *B30B 15/04* (2006.01)

(52) U.S. Cl.
 CPC .............. *B29C 43/34* (2013.01); *B29C 43/36* (2013.01); *B30B 15/04* (2013.01); *B29C 2043/3416* (2013.01)

(58) Field of Classification Search
 CPC ....... B30B 15/04; B30B 15/064; B29C 43/04; B29C 43/34; B29C 43/36; B29C 43/52; B29C 2043/046; B29C 2043/3483
 See application file for complete search history.

(56) References Cited

U.S. PATENT DOCUMENTS

| | | | | |
|---|---|---|---|---|
| 2,544,540 A | * | 3/1951 | Maussnest | B30B 1/28 83/559 |
| 5,066,351 A | * | 11/1991 | Knoll | B29C 43/04 264/237 |
| 5,269,167 A | * | 12/1993 | Gerhart | B21D 19/08 72/381 |
| 5,881,599 A | * | 3/1999 | Sasahara | B21D 28/32 100/291 |

FOREIGN PATENT DOCUMENTS

| | | | |
|---|---|---|---|
| JP | 2013-248665 A | | 12/2013 |
| JP | 2013248665 A | * | 12/2013 |

* cited by examiner

*Primary Examiner* — Jerzi H Moreno Hernandez
(74) *Attorney, Agent, or Firm* — Global IP Counselors, LLP (57) ABSTRACT

A pressing machine that applies heat and pressure to a press object transported in a first direction includes a first die having a first heater, a second die having a second heater and being disposed above the first die, a support member that supports the first die and the second die, and a movement mechanism that moves the support member from a first position to a second position located in a second direction intersecting the first direction from the first position, in which the first position is the position at which the first die and the second die apply heat and pressure to the press object and the second position is the position at which the first die and the second die do not face the press object.

4 Claims, 7 Drawing Sheets

PRESSING MACHINE

The present application is based on, and claims priority from JP Application Serial Number 2021-127233, filed Aug. 3, 2021, the disclosure of which is hereby incorporated by reference herein in its entirety.

BACKGROUND

1. Technical Field

The present disclosure relates to a pressing machine.

2. Related Art

Flat plate pressing that heats and applies pressure to a press object by using an upper die and a lower die is known. The pressing machine described in JP-A-2013-248665 has a lower cylinder below the lower die. The pressing machine lowers the lower die by operating the lower cylinder. In the event of an emergency stop or the like, the pressing machine suppresses the heating of the press object by lowering the lower die.

JP-A-2013-248665 is an example of the related art.

When the lower cylinder is disposed below the lower die, the pressurization position at which pressure is applied by the upper die and the lower die to the press object increases. The higher the pressurization position, the lower the productivity of the worker. Even if measures are taken by raising the floor height to increase the working height of the worker, the overall cost increases disadvantageously.

SUMMARY

According to an aspect of the present disclosure, there is provided a pressing machine that applies heat and pressure to a press object transported in a first direction, the pressing machine including: a first die having a first heater; a second die having a second heater, the second die being disposed above the first die; a support member supporting the first die and the second die; and a movement mechanism that moves the support member from a first position to a second position located in a second direction from the first position, the second direction intersecting the first direction, in which the first position is a position at which the first die and the second die apply heat and pressure to the press object and the second position is a position at which the first die and the second die do not face the press object.

DESCRIPTION OF EXEMPLARY EMBODIMENTS

Figure 1:
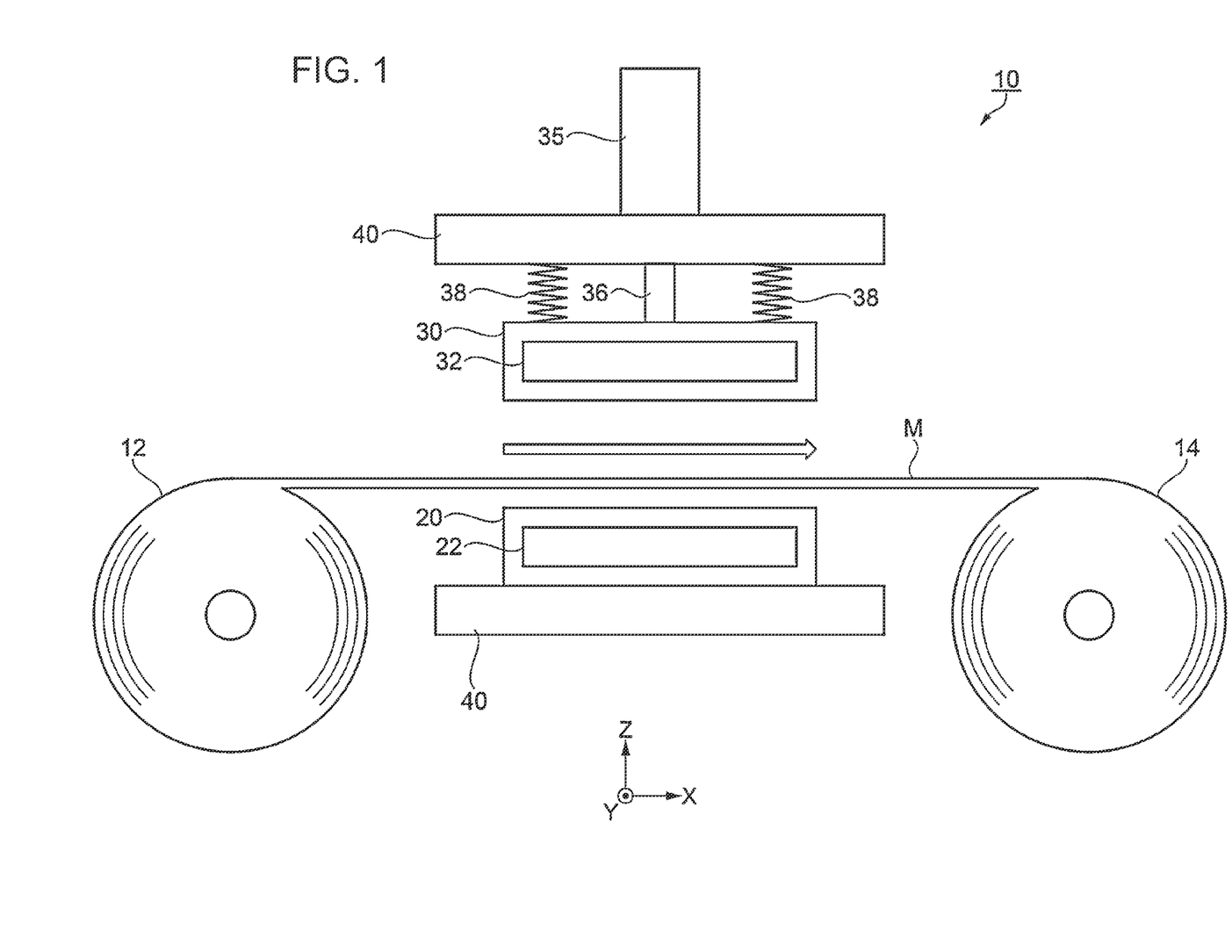
FIG. 1 is a schematic drawing illustrating the structure of a pressing machine.

FIG. 1 schematically illustrates the structure of a pressing machine 10. The pressing machine 10 is a device that apply heat and pressure to a material M drawn from a supply roller 12. The material M to which heat and pressure have been applied by the pressing machine 10 is wound by a winding roller 14. The pressing machine 10 includes a lower die 20, a lower die heater 22, an upper die 30, an upper die heater 32, an air cylinder 35 for the upper die, a suspended spring 38, and a base table 40.

In the drawings, including FIG. 1, the X-Y-Z coordinate system is used. The X-axis, the Y-axis, and the Z-axis are orthogonal to each other. The X-axis is parallel to the installation surface of the pressing machine 10 and corresponds to the width of the pressing machine 10. The Y-axis is parallel to the installation surface of the pressing machine 10 and corresponds to the depth of the pressing machine 10. The Z-axis is orthogonal to the installation surface of the pressing machine 10 and corresponds to the height of the pressing machine 10.

Hereinafter, when the X-Y-Z coordinate system is used, the +X direction, which is parallel to the X-axis, represents the direction in which the material M moves from the supply roller 12 to the winding roller 14. In FIG. 1, the +X direction represents the direction from the center of the drawing to the right. The −X direction, which is parallel to the X-axis, represents the direction from the winding roller 14 to the supply roller 12. In FIG. 1, the −X direction of the X-axis represents the direction from the center of the drawing toward the left. The +Y direction, which is parallel to the Y-axis, represents the direction from the back to the near side of the pressing machine 10 when the supply roller 12 is disposed on the left side of the base table 40. In FIG. 1, the +Y direction, which is parallel to the Y-axis, represents the direction toward the near side of the drawing. The −Y direction, which is parallel to the Y-axis, represents the direction from the near side to the back of the pressing machine 10 when the supply roller 12 is disposed on the left side of the base table 40. In FIG. 1, the −Y direction, which is parallel to the Y-axis, represents the direction toward the back of the drawing. The +Z direction, which is parallel to the Z-axis, represents the upward direction from the installation surface of the pressing machine 10. In FIG. 1, the +Z direction, which is parallel to the Z-axis, represents the upward direction from the center of the drawing. The −Z direction, which is parallel to the Z-axis, represents the direction from above the pressing machine 10 toward the installation surface. In FIG. 1, the −Z direction, which is parallel to the Z-axis, represents the downward direction from the center of the drawing. The −Z direction corresponds to the vertical direction. The +X direction corresponds to an example of the first direction.

The lower die 20 is disposed at a position in the −Z direction from the material M drawn from the supply roller 12. The lower die 20 makes contact with the material M with a lower die press surface facing the material M. The lower die press surface has a rectangular shape. The lower die 20 heats the material M in contact with the lower die press surface. The lower die 20 corresponds to an example of the first die.

The lower die heater 22 heats the lower die 20. The lower die heater 22 may be a resistance heating device or an induction heating device. The lower die heater 22 may be disposed on a surface different from the lower die press surface of the lower die 20 or may be disposed inside the lower die 20. The heating temperature of the lower die heater 22 is controlled by a controller, which is not illustrated. The lower die heater 22 corresponds to an example of the first heater.

The upper die 30 is disposed at a position in the +Z direction from the lower die 20 and the material M drawn from the supply roller 12. The upper die 30 is disposed above the lower die 20 and faces the lower die 20. The upper die 30 makes contact with the material M on the upper die press surface facing the lower die press surface of the lower die 20. The upper die press surface has a rectangular shape. The upper die 30 and the lower die 20 apply heat and pressure to the material M with the material M clamped therebetween. The upper die 30 corresponds to an example of the second die.

The upper die heater 32 heats the upper die 30. The upper die heater 32 may be a resistance heating device or an induction heating device. The upper die heater 32 may be disposed on a surface different from the upper die press surface of the upper die 30 or may be disposed inside the upper die 30. The heating temperature of the upper die heater 32 is controlled by a controller, which is not illustrated. The upper die heater 32 corresponds to an example of the second heater.

The air cylinder 35 for the upper die is disposed on the base table 40, which will be described later. The air cylinder 35 for the upper die has an air cylinder rod 36 for the upper die. The air cylinder 35 for the upper die is an actuator that linearly moves the air cylinder rod 36 for the upper die by using compressed air. The air cylinder rod 36 for the upper die supports the upper die 30. The air cylinder 35 for the upper die moves, in the −Z direction, the upper die 30 supported by the air cylinder rod 36 for the upper die. When compressed air is put into the air cylinder 35 for the upper die, the air cylinder rod 36 for the upper die moves the upper die 30 in the −Z direction.

When the air cylinder 35 for the upper die moves the upper die 30 in the −Z direction, the upper die 30 and the lower die 20 clamp the material M therebetween and apply heat and pressure to the material M. After the upper die 30 and the lower die 20 apply heat and pressure to the material M, the compressed air in the air cylinder 35 for the upper die is removed. When the compressed air is removed from the air cylinder 35 for the upper die, the upper die 30 moves in the +Z direction. When the upper die 30 moves in the +Z direction, the upper die 30 is not in contact with the material M.

The suspended spring 38 is disposed on the base table 40, which will be described later. The suspended spring 38 is coupled to the upper die 30 and supports the upper die 30. When the compressed air in the air cylinder 35 for the upper die is removed, the suspended spring 38 moves the upper die 30 in the +Z direction by using an elastic force. When the compressed air is put into the air cylinder 35 for the upper die, the air cylinder rod 36 for the upper die moves the upper die 30 in the −Z direction against the elastic force of the suspended spring 38. The pressing machine 10 illustrated in FIG. 1 has two suspended springs 38, but the present disclosure is not limited to this example. The number of suspended springs 38 may be one or may be three or more. The suspended spring 38 needs only to support the upper die 30.

The base table 40 supports the lower die 20 and the upper die 30. The base table 40 supports the upper die 30 via the air cylinder rod 36 for the upper die and the suspended spring 38. The base table 40 is moved by a slide mechanism 70, which will be described later. The base table 40 corresponds to an example of the support member.

The material M is molded by the pressing machine 10. The material M is a fiber material molded into, for example, a sound absorbing material that absorbs sound, a cushioning material that absorbs external impact forces, an ink absorber that absorbs ink, or the like. The fiber material is a fibrous web in which a defibrated product obtained by defibrating a fiber raw material containing fibers and a molten material are deposited. The material M corresponds to an example of the press object.

First Embodiment

Figure 2:
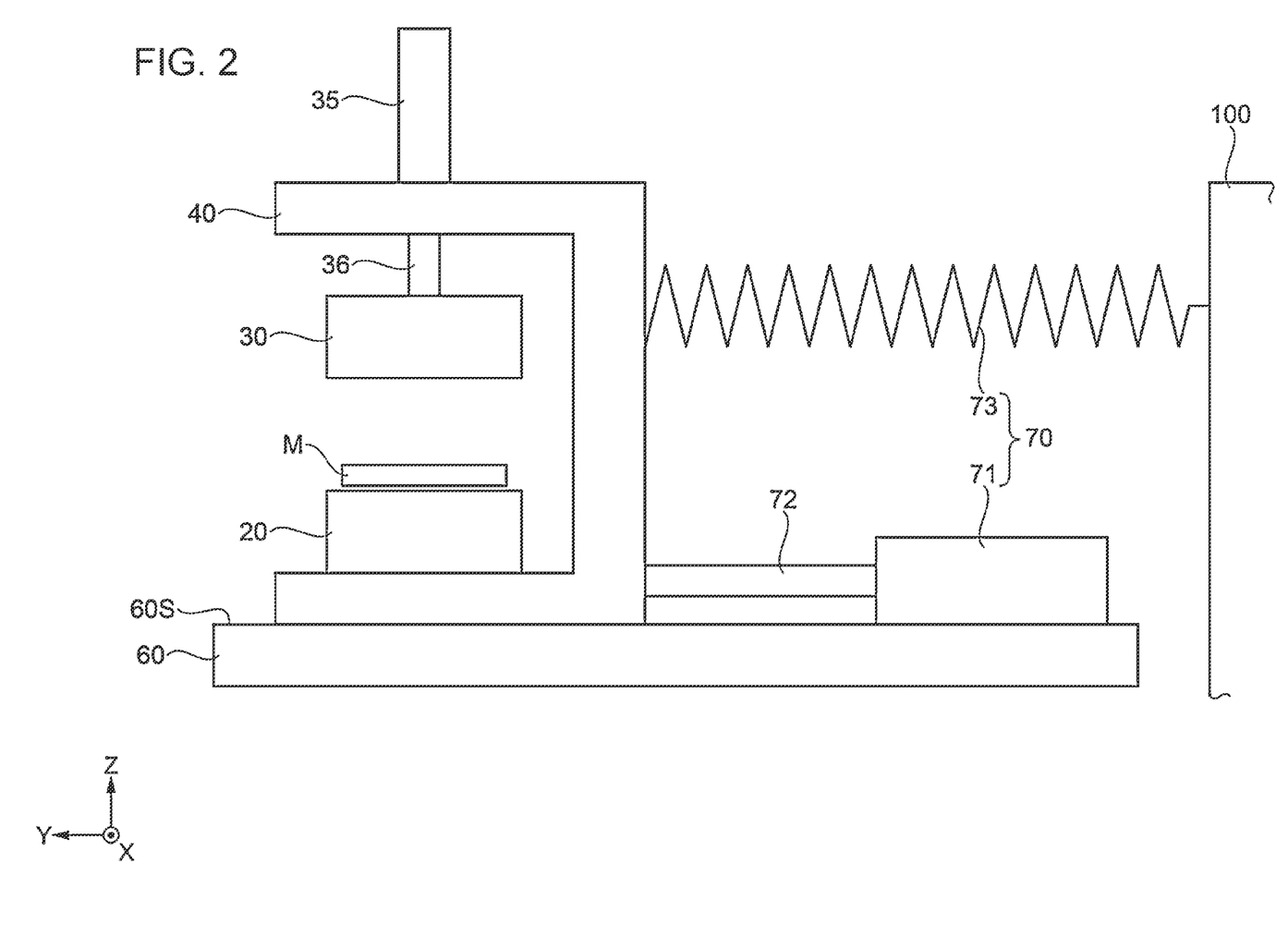
FIG. 2 is a schematic drawing illustrating the structure of the pressing machine in which a base table is located at an operating position.
Figure 3:
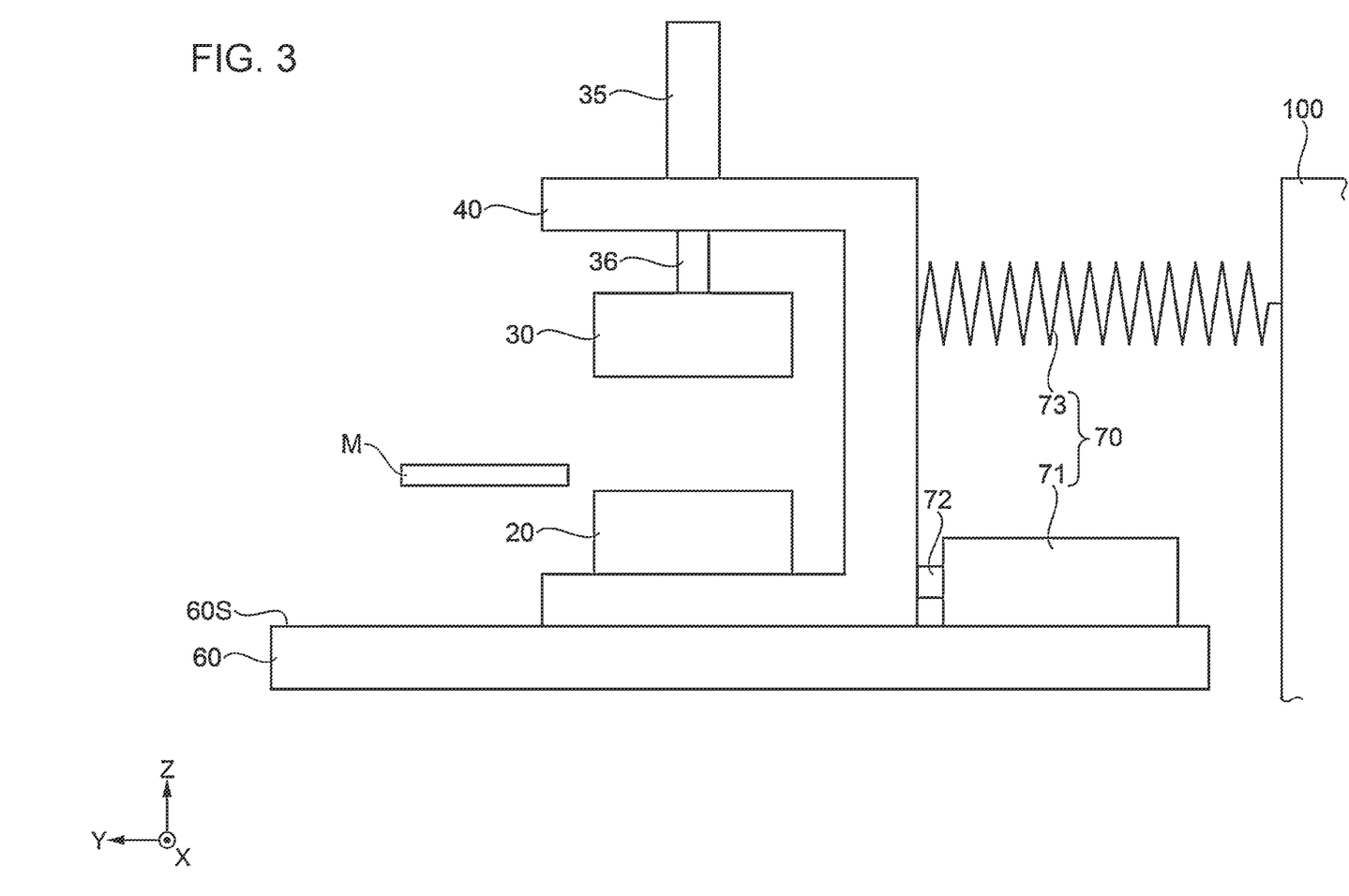
FIG. 3 is a schematic drawing illustrating the structure of the pressing machine in which the base table is located at a retracted position.

FIG. 2 schematically illustrates the structure of the pressing machine 10 in which the base table 40 is located in an operating position. FIG. 3 schematically illustrates the structure of the pressing machine 10 in which the base table 40 is located in a retracted position. FIGS. 2 and 3 are drawings of the pressing machine 10 as seen in the +X direction. FIGS. 2 and 3 illustrate the structure of the pressing machine 10 according to the first embodiment. The operating position is the position at which the lower die 20 and the upper die 30 supported by the base table 40 face the material M. At the operating position, the lower die 20 and the upper die 30 can apply heat and pressure to the material M. The operating position corresponds to an example of the first position. The retracted position is the position at which the lower die 20 and the upper die 30 supported by the base table 40 do not face the material M. When the base table 40 moves to the retracted position, the material M is not able to easily receive the radiant heat from the lower die 20 and the radiant heat from the upper die 30. The retracted position corresponds to an example of the second position.

FIGS. 2 and 3 illustrate the lower die 20, the upper die 30, the air cylinder 35 for the upper die, the air cylinder rod 36 for the upper die, the base table 40, and the material M. In addition, FIGS. 2 and 3 illustrate a lower frame 60, the slide mechanism 70, and a first side frame 100. FIGS. 2 and 3 illustrate an air cylinder 71 for the base table and a spring 73 for the base table that are included in the slide mechanism 70. FIGS. 2 and 3 do not illustrate the lower die heater 22, the upper die heater 32, and the suspended spring 38.

The air cylinder 35 for the upper die may be, for example, a hydraulic cylinder, a mechanical drive mechanism, a motor, or the like as long as pressing is possible. In this case, it is also possible to use a structure having another mechanism for temporarily releasing the brake or the like during movement to an avoiding position in the upward direction via a spring.

The lower frame 60 supports the base table 40 and the air cylinder 71 for the base table. The lower frame 60 movably supports the base table 40 along an axis parallel to the Y-axis. A mount surface 60S of the lower frame 60 on which the base table 40 is mounted may be provided with a guide member for guiding the base table 40, which is not illustrated.

The slide mechanism 70 has the air cylinder 71 for the base table and the spring 73 for the base table. The slide mechanism 70 is provided at a position, located in a direction intersecting the direction in which the material M is transported, that is not below the lower die 20 located at the operating position. In FIGS. 2 and 3, the slide mechanism 70 is provided at a position in the −Y direction. The slide mechanism 70 moves the base table 40 in the −Y direction and the +Y direction by using the air cylinder 71 for the base table and the spring 73 for the base table. When the slide mechanism 70 moves the base table 40 in the −Y direction, the base table 40 is located at the retracted position. When the slide mechanism 70 moves the base table 40 in the +Y direction, the base table 40 is located at the operating position. The slide mechanism 70 corresponds to an example of the movement mechanism. The −Y direction is orthogonal to the −Z direction and corresponds to an example of the second direction. The +Y direction corresponds to an example of the direction opposite to the second direction.

The air cylinder 71 for the base table is disposed on the lower frame 60. The air cylinder 71 for the base table has an air cylinder rod 72 for the base table. The air cylinder 71 for the base table is an actuator that linearly moves the air cylinder rod 72 for the base table by using compressed air. The air cylinder rod 72 for the base table is coupled to the base table 40. The air cylinder 71 for the base table moves the base table 40 coupled to the air cylinder rod 72 for the base table in the +Y direction. When compressed air is put into the air cylinder 71 for the base table, the air cylinder rod 72 for the base table moves the base table 40 in the +Y direction. The base table 40 is moved from the retracted position to the operating position when compressed air is put into the air cylinder 71 for the base table. The air cylinder 71 for the base table corresponds to an example of the moving member. The member that moves the base table 40 from the retracted position to the operating position is not limited to an air cylinder. A hydraulic cylinder, a mechanical drive mechanism, a motor, or the like may be used as long as the member is able to move the base table 40.

The spring 73 for the base table is coupled to the base table 40 and the first side frame 100. When the compressed air in the air cylinder 71 for the base table is removed, the spring 73 for the base table moves the base table 40 in the −Y direction by using an elastic force. When compressed air is put into the air cylinder 71 for the base table, the air cylinder rod 72 for the base table moves the base table 40 in the +Y direction against the elastic force of the spring 73 for the base table. The pressing machine 10 illustrated in FIGS. 2 and 3 has one spring 73 for the base table, but the present disclosure is not limited to this example. Two or more springs 73 for the base table may be used. An alternative member of the spring 73 for the base table may be used to move the base table 40 in the −Y direction. The alternative member of the spring 73 for the base table needs only to provide a force for moving the base table 40 in the −Y direction. The spring 73 for the base table corresponds to an example of the elastic member.

As illustrated in FIGS. 2 and 3, the base table 40 that supports the lower die 20 and the upper die 30 moves to the operating position and the retracted position. The spring 73 for the base table provides an elastic force for moving the base table 40 in the −Y direction. The elastic force for moving the base table 40 in the −Y direction corresponds to an example of the force for moving in the second direction. The air cylinder 71 for the base table moves the base table 40 in the +Y direction.

As illustrated in FIG. 2, when the base table 40 is located at the operating position, the lower die 20 and the upper die 30 face the material M. When the base table 40 is located at the operating position, the air cylinder 35 for the upper die causes the lower die 20 and the upper die 30 to apply heat and pressure to the material M by moving the upper die 30 in the −Z direction. The lower die 20 and the upper die 30 mold the material M by applying heat and pressure.

As illustrated in FIG. 3, when the base table 40 is located at the retracted position, the lower die 20 and the upper die 30 do not face the material M. The lower die 20 is located at a position that differs from the position in the −Z direction from the material M. The upper die 30 is located at a position that differs from the position in the +Z direction from the material M. Since the lower die 20 and the upper die 30 are located at positions at which the lower die 20 and the upper die 30 do not face the material M, the radiant heat from the lower die 20 and the radiant heat from the upper die 30 do not easily affect the material M. For example, when the base table 40 moves to the retracted position in a case in which the pressing machine 10 stops, the heat transferred to the material M while the pressing machine 10 stops is reduced. When the properties of the material M are easily changed by heat, the change in the properties of the material M when the pressing machine 10 stops is reduced. In addition, when the base table 40 is located at the retracted position, the lower die heater 22 and the upper die heater 32 can maintain the heating during the stop. The pressing machine 10 can resume molding in a short time when the base table 40 moves from the retracted position to the operating position.

As illustrated in the first embodiment, the slide mechanism 70 moves the base table 40 in the −Y direction. On the base table 40, the slide mechanism 70 has the spring 73 for the base table, which provides an elastic force for movement in the −Y direction, and the air cylinder 71 for the base table, which moves the base table 40 in the +Y direction.

The pressing machine 10 does not need to have the slide mechanism 70 below the operating position by moving the base table 40 in the −Y direction.

Second Embodiment

Figure 4:
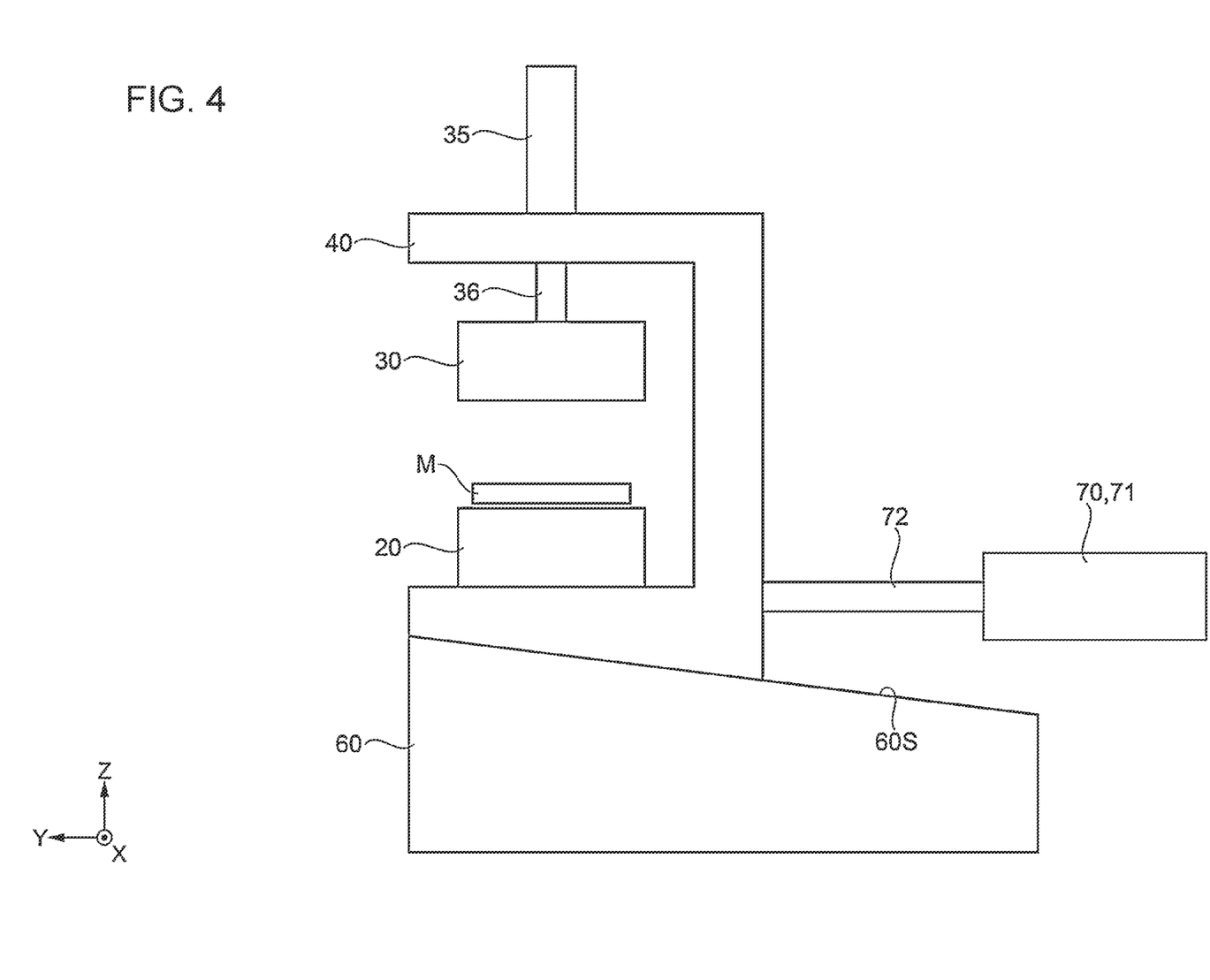
FIG. 4 is a schematic drawing illustrating the structure of a pressing machine in which a base table is located at the operating position.
Figure 5:
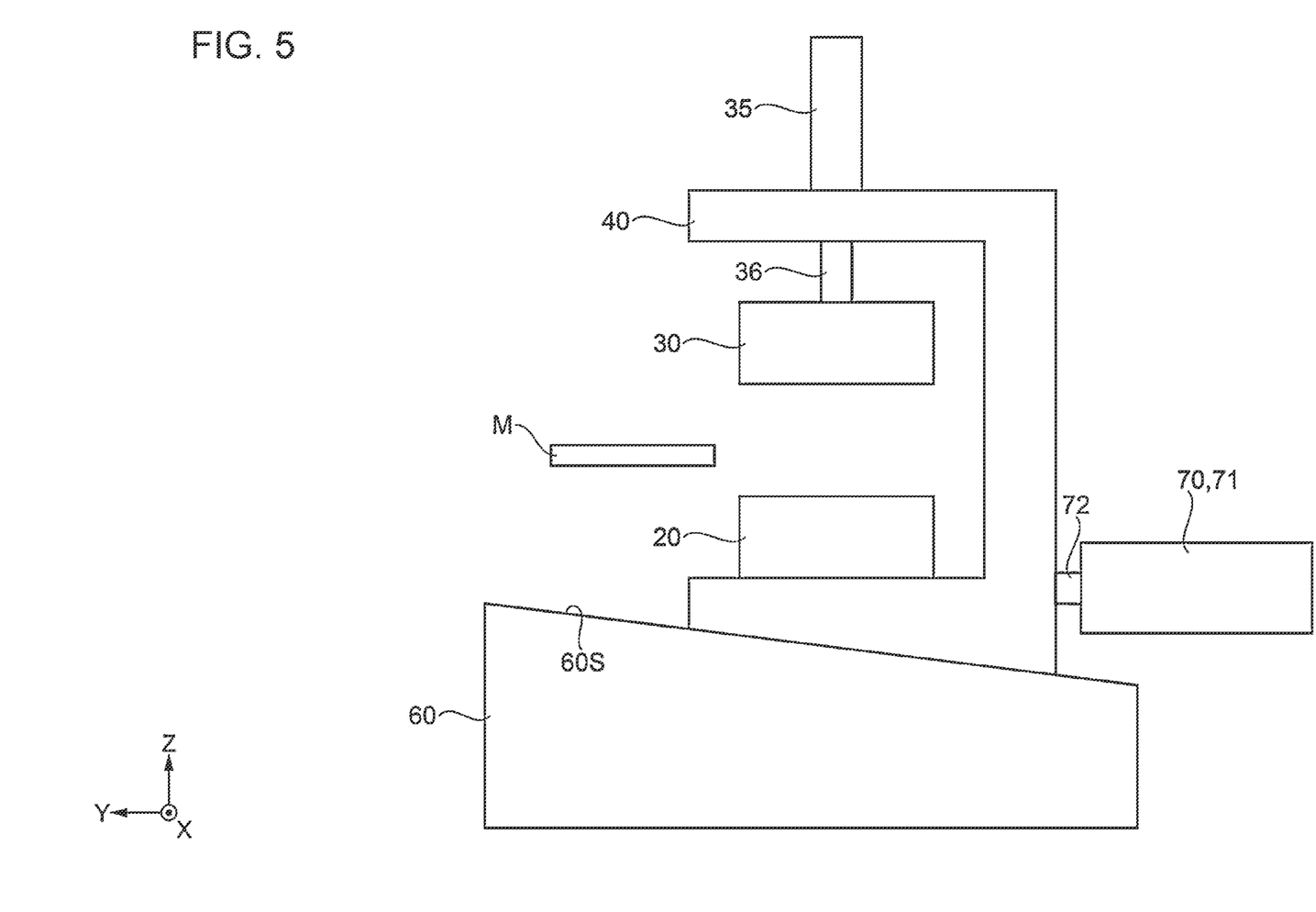
FIG. 5 is a schematic drawing illustrating the structure of the pressing machine in which the base table is located at the retracted position.

FIG. 4 schematically illustrates the structure of the pressing machine 10 in which the base table 40 is located at the operating position. FIG. 5 schematically illustrates the structure of the pressing machine 10 in which the base table 40 is located at the retracted position. FIGS. 4 and 5 are drawings of the pressing machine 10 as seen in the +X direction. FIGS. 4 and 5 illustrate the structure of the pressing machine 10 according to the second embodiment. The operating position is the position at which the lower die 20 and the upper die 30 supported by the base table 40 face the material M. At the operating position, the lower die 20 and the upper die 30 can apply heat and pressure to the material M. The operating position corresponds to an example of the first position. The retracted position is the position at which the lower die 20 and the upper die 30 supported by the base table 40 do not face the material M. When the base table 40 moves to the retracted position, the material M is not able to easily receive the radiant heat from the lower die 20 and the radiant heat from the upper die 30. The retracted position corresponds to an example of the second position.

FIGS. 4 and 5 illustrate the lower die 20, the upper die 30, the air cylinder 35 for the upper die, the air cylinder rod 36 for the upper die, the base table 40, and the material M. In addition, FIGS. 4 and 5 illustrate the lower frame 60 and the slide mechanism 70. FIGS. 4 and 5 illustrate the air cylinder 71 for the base table included in the slide mechanism 70. FIGS. 4 and 5 do not illustrate the lower die heater 22, the upper die heater 32, and the suspended spring 38.

The pressing machine 10 according to the second embodiment does not have the spring 73 for the base table illustrated in FIGS. 2 and 3. In the second embodiment, the mount surface 60S of the lower frame 60 is inclined. The inclined mount surface 60S corresponds to an example of the inclined surface.

The lower frame 60 according to the second embodiment supports the base table 40. The air cylinder 71 for the base table may be supported by the lower frame 60 or may be supported by a frame or the like, which is not illustrated. The lower frame 60 has the mount surface 60S on which the base table 40 is mounted. The mount surface 60S is inclined in the −Z direction while facing the −Y direction. The base table 40 is movable diagonally downward from the operating position to the retracted position on the mount surface 60S. The mount surface 60S may be provided with a guide member, not illustrated, that guides the base table 40.

The slide mechanism 70 has the air cylinder 71 for the base table. The slide mechanism 70 is provided at a position, located in a direction intersecting the direction in which the material M is transported, that is not below the lower die 20 located at the operating position. In FIGS. 4 and 5, the slide mechanism 70 is provided at a position in the −Y direction. The slide mechanism 70 moves the base table 40 diagonally downward while facing the −Y direction and diagonally upward while facing the +Y direction by using the air cylinder 71 for the base table. When the slide mechanism 70 moves the base table 40 diagonally downward, the base table 40 is located at the retracted position. When the slide mechanism 70 moves the base table 40 diagonally upward, the base table 40 is located at the operating position. The slide mechanism 70 corresponds to an example of the movement mechanism. Here, diagonally downward while facing the −Y direction corresponds to an example of the second direction, and diagonally upward while facing the +Y direction corresponds to an example of the direction opposite to the second direction.

The air cylinder 71 for the base table has the air cylinder rod 72 for the base table. The air cylinder 71 for the base table is an actuator that linearly moves the air cylinder rod 72 for the base table by using compressed air. The air cylinder rod 72 for the base table is coupled to the base table 40.

As illustrated in FIG. 5, the base table 40 is located at the retracted position with no compressed air in the air cylinder 71 for the base table. When compressed air is put into the air cylinder 71 for the base table, the air cylinder rod 72 for the base table moves the base table 40 diagonally upward while facing the +Y direction. The base table 40 is moved from the retracted position to the operating position when compressed air is put into the air cylinder 71 for the base table. The base table 40 is located at the operating position as illustrated in FIG. 4 with compressed air in the air cylinder 71 for the base table.

When the compressed air in the air cylinder 71 for the base table is removed, the pressing force to be applied to the base table 40 by the air cylinder rod 72 for the base table is reduced. When the pressing force is reduced, the base table 40 moves diagonally downward while facing the −Y direction along the inclination of the mount surface 60S due to the weight thereof. The base table 40 moves diagonally downward while facing the −Y direction and diagonally upward while facing the +Y direction in response to the pressing force applied to the base table 40 by the air cylinder 71 for the base table. The air cylinder 71 for the base table corresponds to an example of the moving member.

The slide mechanism 70 can use the weight of the base table 40 to move the base table 40 diagonally downward. Since the compressed air in the air cylinder 71 for the base table is removed when the power is switched off, the base table 40 moves from the operating position to the retracted position in an emergency such as power-off. When the power to the pressing machine 10 is switched off, the possibility that the material M receives extra heat is reduced.

As illustrated in the second embodiment, the direction in which the base table 40 moves is the direction diagonally downward of the material M. The base table 40 is mounted on the mount surface 60S inclined diagonally downward while facing the −Y direction. The slide mechanism 70 has the air cylinder 71 for the base table that moves the base table 40 diagonally downward while facing the −Y direction and diagonally upward while facing the +Y direction.

The slide mechanism 70 can use the weight of the base table 40 including the lower die 20 and the upper die 30 to move the base table 40 by moving the base table 40 diagonally downward.

Third Embodiment

Figure 6:
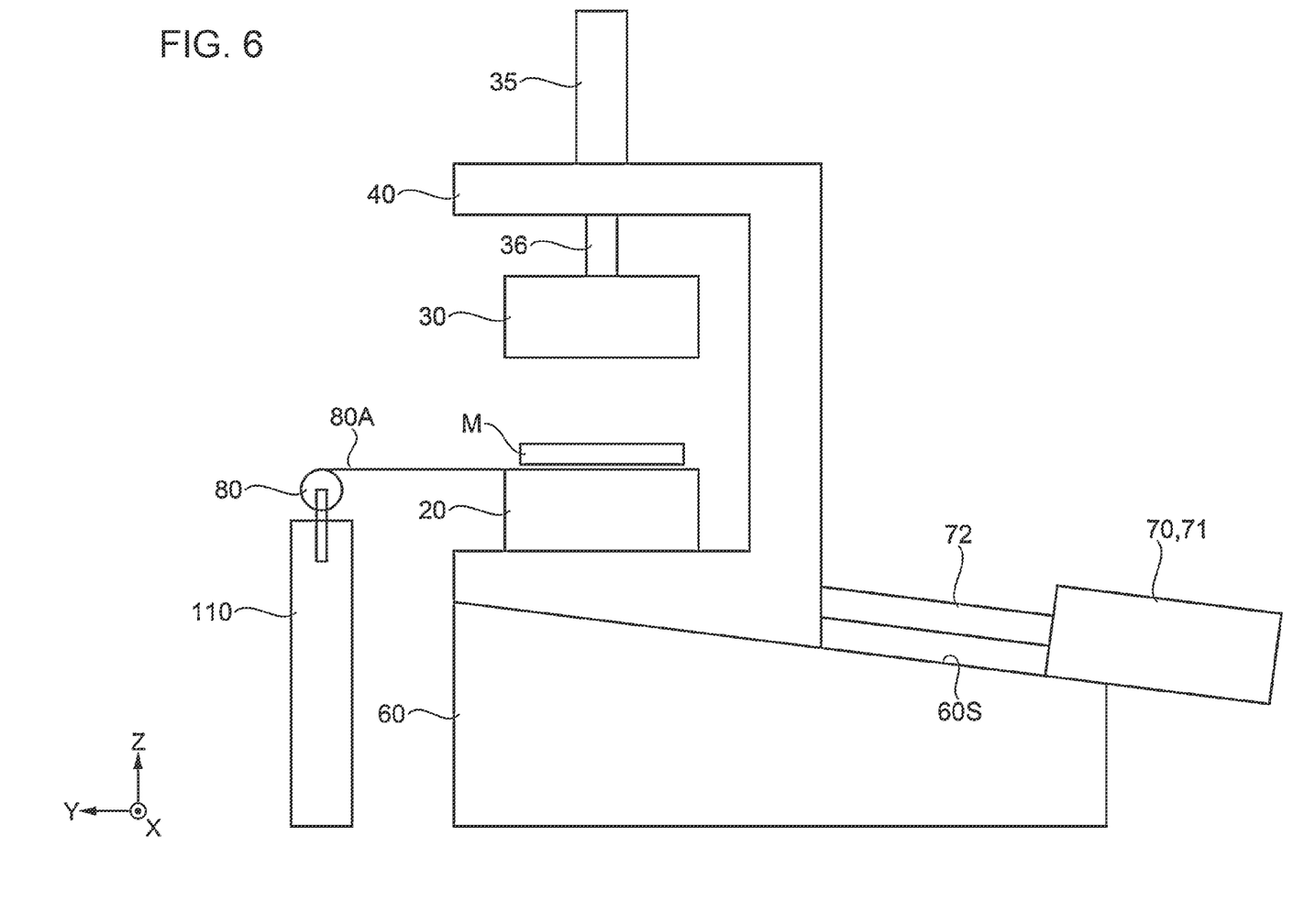
FIG. 6 is a schematic drawing illustrating the structure of a pressing machine in which a base table is located at the operating position.
Figure 7:
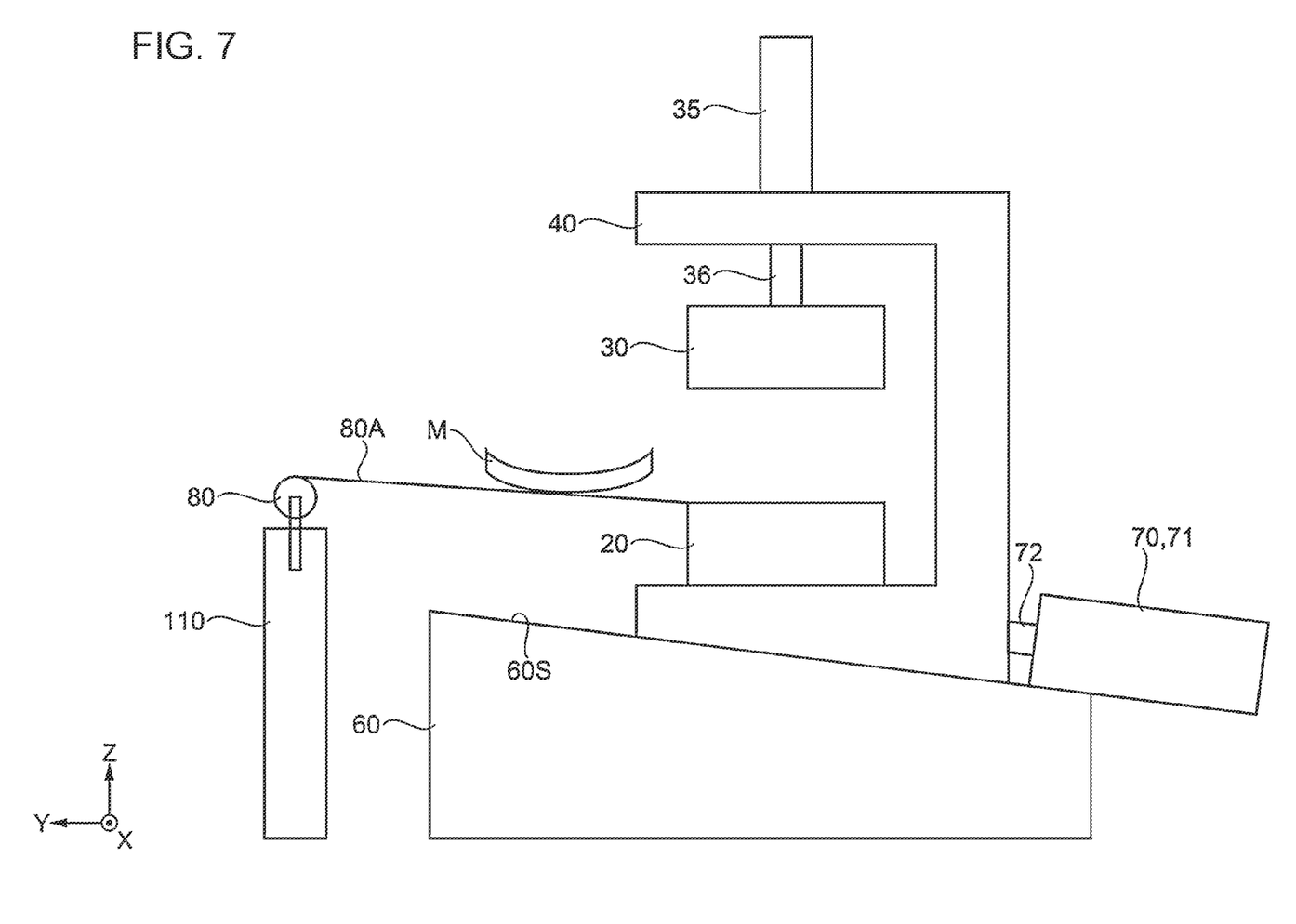
FIG. 7 is a schematic drawing illustrating the structure of the pressing machine in which the base table is located at the retracted position.

FIG. 6 schematically illustrates the structure of the pressing machine 10 in which the base table 40 is located at the operating position. FIG. 7 schematically illustrates the structure of the pressing machine 10 in which the base table 40 is located at the retracted position. FIGS. 6 and 7 are drawings of the pressing machine 10 as seen in the +X direction. FIGS. 6 and 7 illustrate the structure of the pressing machine 10 according to the third embodiment. The operating position is the position at which the lower die 20 and the upper die 30 supported by the base table 40 face the material M. At the operating position, the lower die 20 and the upper die 30 can apply heat and pressure to the material M. The operating position corresponds to an example of the first position. The retracted position is the position at which the lower die 20 and the upper die 30 supported by the base table 40 do not face the material M. When the base table 40 moves to the retracted position, the material M is not able to easily receive the radiant heat from the lower die 20 and the radiant heat from the upper die 30. The retracted position corresponds to an example of the second position.

FIGS. 6 and 7 illustrate the lower die 20, the upper die 30, the air cylinder 35 for the upper die, the air cylinder rod 36 for the upper die, the base table 40, and the material M. In addition, FIGS. 6 and 7 illustrate the lower frame 60, the slide mechanism 70 including the air cylinder 71 for the base table, a winding spring 80, and a second side frame 110. FIGS. 6 and 7 do not illustrate the lower die heater 22, the upper die heater 32, and the suspended spring 38.

The pressing machine 10 according to the third embodiment has the winding spring 80. The pressing machine 10 according to the third embodiment has the same structure as the pressing machine 10 according to the second embodiment with the exception of the air cylinder 71 for the base table and the winding spring 80.

The air cylinder 71 for the base table according to the third embodiment is supported at the position in the −Y direction on the mount surface 60S of the lower frame 60. The air cylinder 71 for the base table is disposed along the inclination of the mount surface 60S. The air cylinder rod 72 for the base table moves linearly along the inclination of the mount surface 60S. The air cylinder 71 for the base table can apply a pressing force in the movement direction of the base table 40.

The second side frame 110 is disposed at the position in the +Y direction from the lower frame 60. The second side frame 110 may be configured integrally with the lower frame 60. The second side frame 110 supports the winding spring 80.

The winding spring 80 is disposed in the +Y direction from the lower die 20. The winding spring 80 has a spring member 80A. The spring member 80A is, for example, a leaf spring. The spring member 80A may be a wire. The spring member 80A has elasticity. One end of the spring member 80A is coupled to the lower die 20. The upper end in the +Y direction of the lower die 20 is coupled to the spring member 80A.

As illustrated in FIG. 6, when the base table 40 is located at the operating position, the winding spring 80 winds the spring member 80A to a predetermined length. The winding spring 80 rewinds the spring member 80A by using the elastic force of the spring member 80A. The winding spring 80 pulls the lower die 20 in the +Y direction while applying tension. When the base table 40 is located at the operating position, the winding spring 80 applies a tensile force that assists the pressing force applied by the air cylinder 71 for the base table.

FIG. 7 illustrates the state when the base table 40 has moved from the operating position to the retracted position at an unexpected timing. When receiving an instruction for moving the base table 40 to the retracted position while applying heat and pressure to the material M, the pressing machine 10 moves the base table 40 from the operating position to the retracted position. The strength of the material M may be reduced while heat and pressure are applied to the material M depending on the properties of the material. As illustrated in FIG. 7, the material M may be transformed due to the weight thereof as the strength is reduced. Tension is applied to the spring member 80A when the base table 40 moves. The spring member 80A extends below the material M. When the base table 40 moves from the operating position to the retracted position, the spring member 80A can support the transformed material M. The winding spring 80 corresponds to an example of the support mechanism.

When the base table 40 moves from the retracted position to the operating position, the spring member 80A supports the transformed material M. The spring member 80A can reduce the possibility that the transformed material M makes contact with the lower die 20 when the base table 40 moves from the retracted position to the operating position. When the base table 40 moves from the retracted position to the operating position, the material M is less likely to be damaged.

When the base table 40 moves from the retracted position to the operating position, tension is applied to the spring member 80A. The winding spring 80 applies a tensile force diagonally upward while facing the +Y direction during movement of the base table 40. The winding spring 80 can assist the air cylinder 71 for the base table when moving the base table 40.

As illustrated in the third embodiment, the pressing machine 10 has the winding spring 80 as the support mechanism that can support the material M when the base table 40 moves in the −Y direction.

The material M may be bent by receiving heat and pressure. The pressing machine 10 can reduce the possibility that the lower die 20 makes contact with the material M because the winding spring 80 supports the material M when the base table 40 moves in the −Y direction. An embodiment in which the winding spring 80 is used has been described as a preferred example of the support mechanism, but any mechanism having the same function can be applied to the present disclosure.

As described above, the pressing machine 10 applies heat and pressure to the material M transported in the +X direction. The pressing machine 10 includes the lower die 20 having the lower die heater 22, the upper die 30 having the upper die heater 32 and being located above the lower die 20, the base table 40 supporting the lower die 20 and the upper die 30, and the slide mechanism 70 that moves the base table 40 from the operating position to the retracted position located in the −Y direction intersecting the +X direction from the operating position. The operating position is the position at which the lower die 20 and the upper die 30 apply heat and pressure to the material M. The retracted position is the position at which the lower die 20 and the upper die 30 do not face the material M.

The pressing machine 10 does not need to have the movement mechanism below the lower die 20 located at the operating position by moving the base table 40 that supports the lower die 20 and the upper die 30 to the retracted position in the −Y direction. Since the pressing machine 10 does not need to raise the press position to have the movement mechanism, the productivity of the worker is not reduced.

What is claimed is:

1. A pressing machine that applies heat and pressure to a press object transported in a first direction, the pressing machine comprising:
    a first die having a first heater;
    a second die having a second heater, the second die being disposed above the first die;
    a frame with an inclined surface;
    a support member slidably mounted on the inclined surface of the frame and supporting the first die and the second die; and
    an actuator operatively coupled to the support member to move the support member together with the first die and the second die along the inclined surface of the frame between a first position and a second position, the second position being located in a second direction from the first position, the second direction intersecting the first direction, wherein
    the first position is a position at which the first die and the second die apply heat and pressure to the press object,
    the second position is a position at which the first die and the second die do not face the press object, and
    the first die and the second die move away from the press object while moving diagonally and downwardly when the actuator moves the support member together with the first die and the second die along the inclined surface of the frame from the first position to the second position.

2. The pressing machine according to claim 1, wherein the second direction is a direction diagonally downward of the press object, and
    the actuator moves the support member in the second direction and a direction opposite to the second direction.

3. The pressing machine according to claim 2, further comprising:
    a support configured to support the press object when the support member moves in the second direction.

4. The pressing machine according to claim 3, wherein the support is a winding spring.

\* \* \* \* \*